Figures 1, 2:
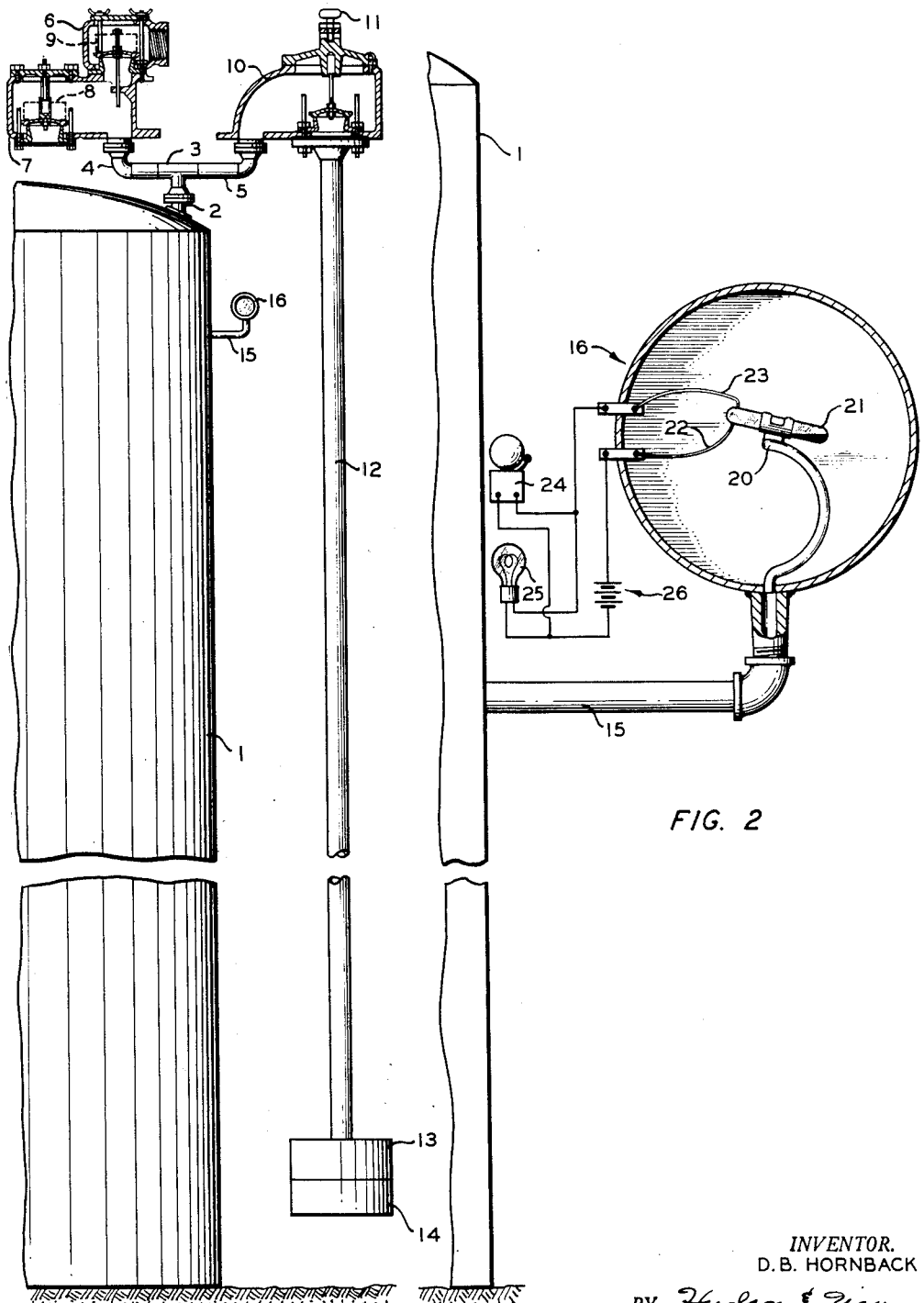

May 28, 1957     D. B. HORNBACK     2,794,183
BREATHING TANK ODOR FILTER AND WARNING DEVICE
Filed Nov. 4, 1954

INVENTOR.
D. B. HORNBACK

ATTORNEYS

2,794,183

BREATHING TANK ODOR FILTER AND WARNING DEVICE

Daniel B. Hornback, Bartlesville, Okla., assignor to Phillips Petroleum Company, a corporation of Delaware Application November 4, 1954, Serial No. 466,895

7 Claims. (Cl. 340—267)

This invention relates to apparatus for use in tank breathing systems to prevent contaminating a stored odorless liquid with the odors contained in the surrounding atmosphere. More specifically it relates to a combination of relief valves with a filter and warning device to control the breathing of the tank and to simultaneously indicate plugging of the filter.

In the storage of liquids in sealed tanks the changes in volume of the liquid through expansion and contraction as well as through discharge and refilling requires a breathing action to draw in fresh air when the gas pressure in the tanks falls below the atmospheric pressure and to discharge vapor when the internal pressure buildup becomes excessive. In order to permit breathing of the tanks it is common to use a combination pressure and vacuum relief valve mechanism. According to this invention the aforesaid mechanism is improved by adding thereto a combination filter and warning device. The purpose of the filter is to clean any air drawn into the tank. Since filters gradually become plugged the purpose of the warning device is to indicate such plugging before it interferes with the breathing of the tank. In addition, the present invention provides means to permit breathing of the tank even after the filters are plugged.

An object of the invention is to provide a combination of means for filtering the air entering a storage tank and for warning that the filter means are becoming plugged. An additional object is the provision of a breathing mechanism for containers of stored liquids, coupled with a warning device to prevent buildup of a large pressure differential between the interior of the tank and the atmosphere. A more specific object is the provision of a combination of relief valves, filter, pressure switch, and warning device to permit normal operation of a tank breathing system and to warn of a breakdown in the operation of such a system.

In accordance with the present invention, a filter is provided in the inlet of a tank breathing system to prevent contacting a stored odorless liquid with an odor contained in the atmosphere. A vacuum relief valve is provided between the tank and the filter to prevent tank vapors from saturating the filters. To prevent buildup of a large pressure differential if the filters become plugged a second vacuum valve, set for a higher vacuum, is provided. A pressure switch with a setting intermediate the settings of the two vacuum relief valves actuates a warning device.

In the accompanying drawings, Figure 1 is a schematic view, partly in section, of the combination of relief valves, pressure switch, and filter units of this invention mounted in place on a storage tank. Figure 2 illustrates a typical warning device for use with the apparatus of this invention.

Referring to Figure 1, there is shown a partially filled tank 1 with an outlet 2 branching at T-fitting 3 into conduits 4 and 5. Conduit 4 is equipped with a combination pressure valve 6 and vacuum relief valve 7. Conduit 5 is equipped with vacuum relief valve 10. These are commercially available type valves and may comprise suitable loading means 8, 9, or thumbscrew tightener 11 to adjust the pressure thereon. Valve 10 is connected to inlet conduit 12 and supplied with an activated carbon filter 13 and a suitable dust filter 14. Pipe 15 extends from the side of tank 1 and is connected into pressure switch 16, illustrated further in Figure 2.

Figure 2 shows one possible construction for pressure switch 16 including a Bourdon tube 20, a mercury switch 21, and leads 22, 23. These are connected in series with a suitable warning device such as a buzzer 24 and light 25 or both, the circuit being energized by a suitable power source 26. In the position shown switch 21 does not make contact between the ends of leads 22, 23; however, when the pressure falls sufficiently in line 15 and Bourdon tube 20 the latter will bend proportionately lower and the mercury contacts both leads and thus closes the circuit. This type of switch is shown in greater detail in U. S. 2,043,441.

As an example of the operation of this apparatus, assume that the pressure relief valve 6 is set at 6 inches of water by suitable loading weight 9; vacuum relief valve 7 is set at 2 inches of water and vacuum relief valve 10 at ½ inch of water vacuum. The filter areas are sized so that their pressure drop is about 1 inch water at rated air flow. Therefore the pressure drop through the filters and valve 10 is about 1½ inches of water. If the pressure switch 16 is set at 1¾ inches of water vacuum it will not be actuated by the aforesaid 1½ inch pressure drop. But when the pressure drop through the filters increases from 1 inch to 1¼ inches, creating a total vacuum pressure of 1¾ inches in the tank, pressure switch 16 is actuated. The operation of the associated warning device warns that the pressure drop through the filters and valve 10 circuit has increased and that the filters should be replaced at the first opportunity. The 2 inches of water vacuum setting on valve 7 is an added safety factor which will allow the tank to breath in case the filters do become saturated and are not replaced in time. The main function of valve 10 is to prevent tank vapors from saturating the activated carbon filter.

Activated carbon filter 13 may be a removable and replaceable cartridge containing preferably activated cocoanut shell carbon, although any other suitable deodorant type of adsorbent may be used. Thus when air is drawn through the carbon granules any odor present therein as well as any moisture is removed. One application for this type of installation is in the protection of isoparaffinic hydrocarbons used as paint thinners and stored where the atmosphere is often contaminated with hydrogen sulfide and mercaptan odors.

Inasmuch as many changes could be made in the construction described above without departing from the scope thereof, it is intended that all matter contained in the above description or shown in the accompanying drawings shall be interpreted as illustrative and not as limiting. For example, the warning device need not be attached directly to the tank, but may be attached to the conduits 2, 4, or 5. In addition, the valves need not be attached to a common conduit as shown in Figure 1, but may be attached directly to the tank. The only limitation on the placement of these elements is that all must be in open communication with the interior of the tank and with each other. As already stated the valves, filter units, and even the warning device may be of any commercially available type so long as they function in the manner described above.

I claim:

1. In a tank breather system for liquid fuel containers, the combination comprising: a storage tank, an outlet conduit in said tank, a vacuum relief valve and a pressure relief valve in said conduit, an air filter, a second conduit connecting said air filter to said vacuum relief valve so that any air drawn into the tank will be filtered, and a warning device in pressure communication with the interior of said tank and responsive to the pressure therein, said device being set to operate when the pressure drop through the filter increases to a predetermined value.

2. In the apparatus of claim 1, a pressure switch associated with said warning device and designed to control the latter's operation.

3. In combination, a liquid storage tank, a pressure relief valve and a vacuum relief valve in open communication with the interior of said tank, an air cleaner, means connecting said air cleaner to said vacuum relief valve whereby air entering the tank through said vacuum relief valve must first pass through said cleaner but tank vapors cannot contact the cleaner, and a warning device in pressure communication with the interior of the tank, said device being actuated when partial failure of the air cleaner causes an increase in the vacuum pressure in the tank.

4. In combination: a storage tank, a first vacuum relief valve in communication therewith, an air cleaner, means connecting said air cleaner and said valve, whereby air drawn into the tank through said vacuum relief valve must first pass through said air cleaner; a second vacuum relief valve in open communication with said tank, the pressure drop through said second valve being greater than that through the first valve and associated air cleaner, whereby said second valve opens only when the pressure drop through the filter rises sufficiently to overcome the pressure differential between the two valves.

5. In the combination of claim 4 a warning device in open communication with the interior of the tank and the aforesaid valves and set to operate when the pressure drop through the second vacuum relief valve and associated cleaner approaches the pressure drop across said first vacuum relief valve.

6. In a tank breathing system designed to prevent the contamination of a stored odorless liquid with an odor contained in the atmosphere, in combination: a storage tank, a first vacuum relief valve in open communication with said storage tank, an odor filter, means connecting said vacuum relief valve with said odor filter, whereby air entering the tank through said vacuum relief valve is first filtered but tank vapors cannot contact said filter; a second vacuum relief valve in open communication with the tank and with said first relief valve, said second vacuum relief valve being set for a higher vacuum than the first so as to prevent buildup of a large pressure differential if the filter becomes plugged; a pressure switch in open communication with the interior of said tank and said valves, said switch being set intermediate the settings of the two vacuum relief valves, and a warning device responsive to said pressure switch, whereby when the tank pressure reaches the setting of the pressure switch said warning device is actuated.

7. In a tank breather system, a combination comprising a storage tank, an air filter in communication with said tank whereby air entering said tank passes through said filter, a first vacuum relief valve between said air filter and said tank to prevent tank vapors from contacting said air filter, and a second vacuum relief valve communicating with said tank and operable only by a pressure differential greater than the normal operating pressure differential across said air filter and said first vacuum relief valve.

References Cited in the file of this patent

UNITED STATES PATENTS

| 1,784,278 | Dollinger | Dec. 9, 1930 |
| 2,320,368 | Leathers | June 1, 1943 |
| 2,499,494 | Greer | Mar. 7, 1950 |

FOREIGN PATENTS

| 471,732 | Germany | Feb. 18, 1929 |